United States Patent [19]

Noda

[11] Patent Number: 4,590,553
[45] Date of Patent: May 20, 1986

[54] MICROCOMPUTER WITH POWER-SAVE OUTPUT INSTRUCTIONS

[75] Inventor: Makoto Noda, Yokohama, Japan

[73] Assignee: Tokyo Shibaura Denki Kabushiki Kaisha, Kawasaki, Japan

[21] Appl. No.: 455,794

[22] Filed: Jan. 5, 1983

[30] Foreign Application Priority Data

Jan. 25, 1982 [JP] Japan .................................. 57-9663

[51] Int. Cl.⁴ ............................................... G06F 1/04
[52] U.S. Cl. ....................................................... 364/200
[58] Field of Search ... 364/200 MS File, 900 MS File, 364/707; 365/227, 226

[56] References Cited

U.S. PATENT DOCUMENTS

| | | | |
|---|---|---|---|
| 3,736,569 | 5/1973 | Bouricws et al. | 364/200 |
| 4,137,563 | 1/1979 | Tsunoda | 364/200 |
| 4,201,887 | 5/1980 | Burns | 364/900 |
| 4,203,153 | 5/1980 | Boyd | 364/200 |
| 4,204,249 | 5/1980 | Dye et al. | 364/200 |
| 4,279,020 | 7/1981 | Christian et al. | 364/900 |
| 4,293,927 | 10/1981 | Hoshii | 364/900 |
| 4,365,290 | 12/1982 | Nelms et al. | 364/200 |
| 4,381,552 | 4/1983 | Nociuni et al. | 364/900 |

OTHER PUBLICATIONS

Data Sheets for NSC800 Microprocessor, p. 15, Jul. 1979, National Semiconductor Crop.

*Primary Examiner*—James D. Thomas
*Assistant Examiner*—William G. Niessen
*Attorney, Agent, or Firm*—Finnegan, Henderson, Farabow, Garrett & Dunner

[57] ABSTRACT

A microcomputer which is set to a power-save mode by an external signal or an output signal from an instruction decoder, and is provided with a flip-flop circuit which is set when microcomputer is set to a power-save mode and is reset upon receipt of an external interruption signal or reset signal, and sends forth a power-save output signal.

4 Claims, 2 Drawing Figures

MICROCOMPUTER WITH POWER-SAVE OUTPUT INSTRUCTIONS

BACKGROUND OF THE INVENTION

This invention relates to a microcomputer provided with a power-save mode.

Recently, as a result of progress in CMOS techniques, microcomputers have been provided with a power-save mode for reducing power consumption. When a particular input signal is supplied or a particular instruction is executed, the ordinary operation mode of a microcomputer is shifted to a power-save mode. In the power-save mode, either a clock signal ceases to be supplied to the internal circuitry of a microcomputer, or "No Operation" (NOP) instruction is executed, thereby reducing power consumption in the microcomputer. Normally, the microcomputer is set to a power-save mode during battery backup.

The conventional microcomputer lacks means for informing an external section (for example, CMOS RAM, etc. constituting a system together with a microcomputer) that the microcomputer is set at a power-save mode. When, the microcomputer is set to a power-save save mode, another peripheral device included in the system cannot also be set to a power-save mode due to this lack of communication. In other words, the whole system fails to be set to a power-save mode, thereby wasting power.

When the microcomputer is set to a power-save mode by execution of a particular instruction, it is desired to change a main power source to a backup battery. Since, however, no instruction can be issued from a microcomputer, it has also been impossible to change a power source to a battery for backup when the microcomputer is set to a power-save mode.

SUMMARY OF THE INVENTION

It is accordingly an object of this invention to provide a microcomputer which can issue a signal instructing a power-save mode, thereby assuring the reduction of power consumption in an overall system including the microcomputer.

To attain the above-mentioned object, this invention provides a microcomputer having a power-save instruction and comprising an instruction decoder which sends forth an output signal from an output terminal corresponding to an instruction received, and a signal generator which is energized by an output signal from the instruction decoder which decodes the power-save instruction and sends forth a power-save instruction signal for a prescribed length of time.

DETAILED DESCRIPTION OF THE PREFERRED EMBODIMENTS

Description is now given with reference to the accompanying drawings of an embodiment of a microcomputer according to this invention.

Figure 1:
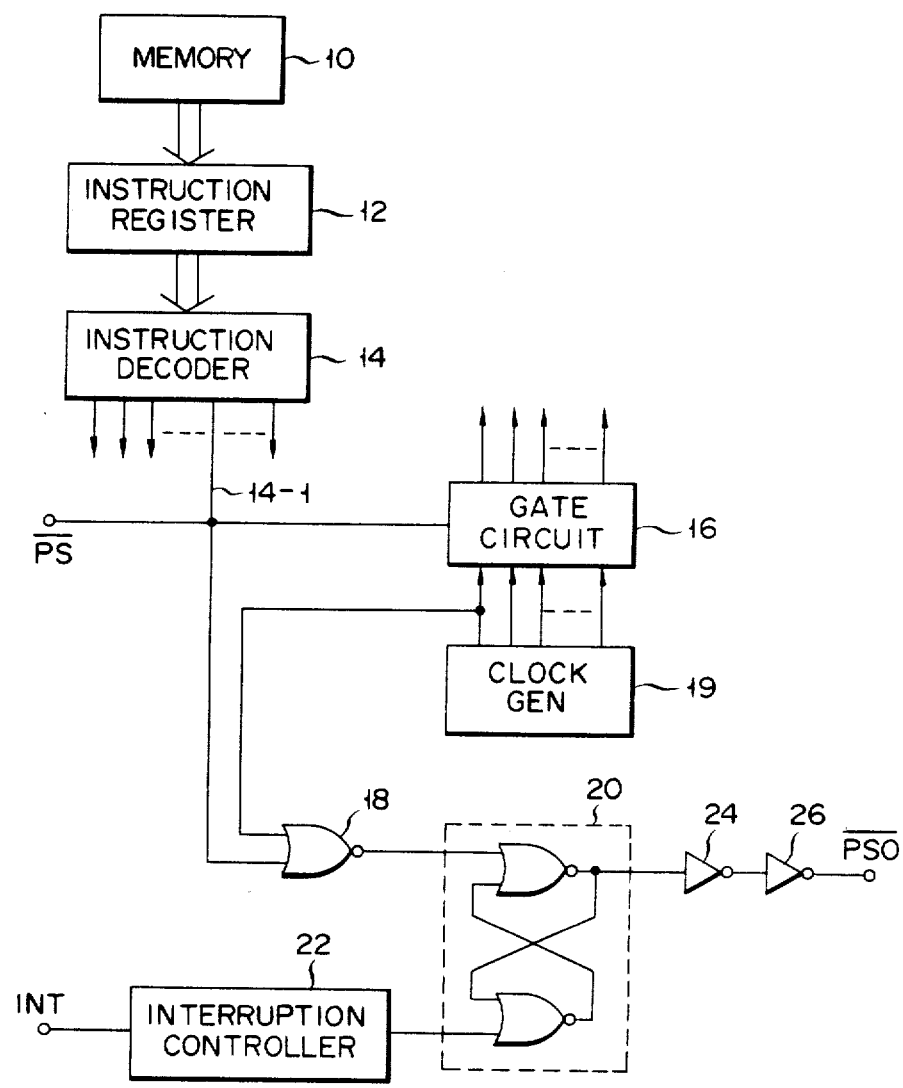
FIG. 1 is a block diagram of the main section of an embodiment of a microcomputer according to this invention.

FIG. 1 is a block diagram of the main section of the microcomputer. An instruction issued from a memory 10 is supplied to an instruction register 12. One of the output terminals of an instruction decoder 14 is rendered active (that is, is set at a logic level "0") in accordance with data issued from the instruction register 12. That output terminal of the instruction decoder 14 which is activated upon receipt of a power-save instruction is connected to a control terminal of a gate circuit 16 and a first input terminal of a NOR gate 18. An output signal from a clock generator 19 which determines operation timings of various sections of the microcomputer is issued through the gate circuit 16.

Among the output signals from the clock generator 19 is a $\overline{PS}$ strobe signal which includes a pulse having a logic level "0" at a predetermined timing during a machine cycle of a microcomputer and which is supplied to a second input terminal of the NOR gate 18. Like the output terminal of the instruction decoder 14 which corresponds to a power-save instruction, a power-save terminal $\overline{PS}$ of the microcomputer is connected to the first input terminal of the NOR gate 18. The power-save terminal $\overline{PS}$ is the terminal which is set at a logic level "0" when the microcomputer is set to a power-save mode by an external control signal. For instance, when power is changed from a main power source to a backup battery, then the power-save terminal $\overline{PS}$ is supplied with a signal having a logic level "0". The output terminal of the NOR gate 18 is connected to a first input terminal of a flip-flop circuit 20. An interruption terminal INT is connected to a second input terminal of the flip-flop circuit 20 through an interruption controller 22. The output terminal of the flip-flop circuit 20 is connected to a power-save output terminal $\overline{PSO}$ through series-connected inverters 24 and 26. The power-save output terminal $\overline{PSO}$ is connected to a power-save terminal of another device included in the system. In the case of CMOS RAM, for example, a chip enable terminal is used as a power-save terminal.

Description is now given of an operation of a microcomputer embodying this invention. When a power-save instruction signal having a logic level "0" is externally supplied to the power-save terminal $\overline{PS}$ of the microcomputer, or a power-save instruction is decoded by the instruction decoder 14, then the control terminal of the gate circuit 16 and the first input terminal of the NOR gate 18 are set at a logic level "0". The output signals from the clock generator 19 are not supplied to the various sections of the microcomputer, therefore the power consumption is reduced. The microcomputer is set to a power-save mode. When the $\overline{PS}$ strobe signal is generated, the second input terminal of the NOR gate 18 is also set to a logic level "0". The output terminal of the flip-flop circuit 20, i.e., the power-save output terminal $\overline{PSO}$ is set to a logic level "0". If the chip enable terminal CE of the CMOS RAM is connected to the power-save output terminal $\overline{PSO}$, the CMOS RAM is also disabled, and set at a power-save mode.

When an interruption signal having a logic level "1" is externally supplied to the interruption terminal INT of the microcomputer, the flip-flop circuit 20 is reset, causing the power-save output terminal $\overline{PSO}$ to be set to a logic level "1". A program counter (not shown) is set to a prescribed value, the power-save instruction is not produced from the memory 10. Accordingly, an output signal from the clock generator 19 is supplied to the various parts of the microcomputer, whose mode is changed from the power-save mode to the ordinary mode.

With the aforementioned embodiment of this invention, the microcomputer can give information to an external section as to whether or not the microcomputer is set to a power-save mode, thereby enabling the whole system to be set to a power-save mode. The process of setting the microcomputer to a power-save mode can be effected either by a program or by an external signal. The resetting of the flip-flop circuit 20, that is, the process of changing the mode of the microcomputer from the power-save mode to the ordinary mode may be carried out not only by an interruption signal but also by a reset signal. Further, a logic level at the output terminal of the flip-flop circuit 20 may be reversed to the opposite level, thereby causing the power-save output terminal $\overline{PSO}$ to be set to a logic level opposite to that which was previously used.

Figure 2:
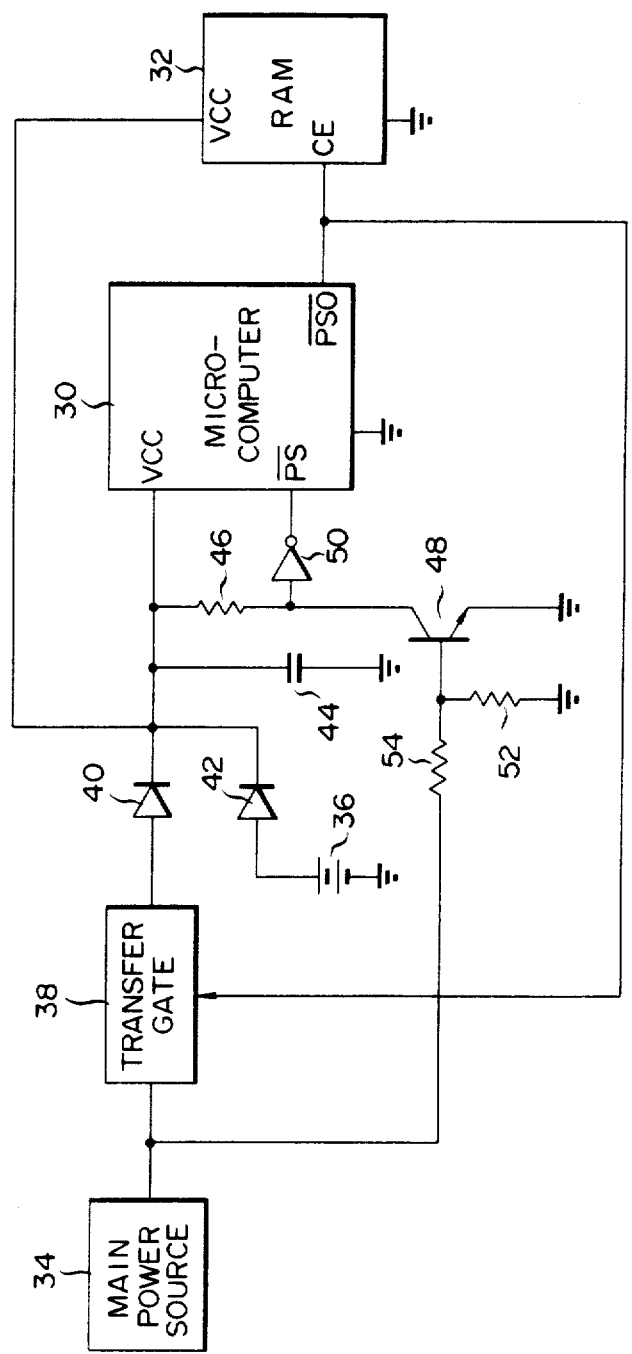
FIG. 2 is a block circuit diagram of a system including the microcomputer of FIG. 1.

Description is now given with reference to FIG. 2 of a system including the above-mentioned microcomputer embodying this invention. This system comprises a microcomputer 30, RAM 32 and power source including a main power source 34 and backup power source (battery) 36. The main power source 34 is connected to the power supply terminals VCC of the microcomputer 30 and the RAM 32 through a transfer gate 38 and diode 40. The backup power source 36 is connected to the power supply terminals VCC of the microcomputer 30 and the RAM 32 through a diode 42. A common cathode of the diodes 40 and 42 is grounded through a capacitor 44 and also through a resistor 46 and the collector-emitter path of a PNP transistor 48. The collector of the transistor 48 is connected to the power-save terminal $\overline{PS}$ of the microcomputer 30 through an inverter 50. The base of the transistor 48 is grounded through a resistor 52 and connected to the main power source 34 through a resistor 54. The power-save output terminal $\overline{PSO}$ of the microcomputer 30 is connected to the chip enable terminal CE of the RAM 32 and also to a control terminal of the transfer gate 38.

Description is now given of the operation of the system shown in FIG. 2. When the main power source voltage is higher than the backup power source voltage, the diode 40 is rendered conductive, causing the microcomputer 30 to be impressed with the main power source voltage. The transistor 48 is rendered conductive, causing the power-save input terminal $\overline{PS}$ to be set to a logic level "1". The gate circuit 16 is rendered conductive, enabling the microcomputer 30 to carry out the ordinary operation. Since, the flip-flop circuit 20 is not reset, the power-save output terminal $\overline{PSO}$ is set to a logic level "1". The transfer gate 38 is rendered conductive, because the control terminal is set to a logic level "1".

When the main power source voltage is lower than the backup power source voltage, the diode 42 is rendered conductive and the microcomputer 30 is only impressed with low voltage from the backup power source. The transistor 48 is rendered nonconductive, causing the power-save input terminal $\overline{PS}$ to be set to a logic level "0". The clock generator 19 is disconnected from the system, causing the microcomputer 30 to be set to a power-save mode. When the flip-flop circuit 20 is set by the $\overline{PS}$ strobe signal, the power-save output terminal $\overline{PSO}$ is set to a logic level "0". The RAM 32 is disabled, and the transfer gate 38 is rendered nonconductive, thereby reducing the power consumption of the whole system. The power-saving effect is also assured when the microcomputer 30 is set to a power-save mode in accordance with the program of the microcomputer 30. When the microcomputer 30 is set to a power-save mode by decoding the power-save instruction, the power-save output terminal $\overline{PSO}$ is logic level "0". The transfer gate 38 is rendered nonconductive. The main power source 34 is disconnected from the microcomputer 30 and the microcomputer 30 is supplied with power from the battery 36.

In the foregoing description, the clock generator 19 was disconnected from the system at the power-save mode. However, it is possible to stop the operation of the clock generator 19 or execute the NOP instruction.

As described above, this invention can provide a microcomputer which enables other sections of the system to be informed of the power-save mode of the microcomputer, thereby assuring the power saving of the whole system.

What is claimed is:

1. A microcomputer having an operation state and a power-save state, said microcomputer being responsive to a power-save instruction to reduce its own power consumption by entering said power-save state, and being responsive to an externally-supplied interruption signal to return to an operation state from said power-save state, said microcomputer comprising:

a memory for storing instructions, including said power-save instruction, for execution by said microcomputer;

an instruction decoded coupled to said memory for generating a power-save signal corresponding to said power-save instruction;

a flip-flop circuit for providing a power-save output signal, said flip-flop having a set terminal coupled to the power-save signal of the instruction decoder and a reset terminal coupled to said externally-supplied interruption signal;

a clock generator for supplying clock signals to said microcomputer, said clock generator including means for receiving said power-save signal from the instruction decoder and turning off said clock signals in response to said power-save instruction; and input means connected to said set terminal of said flip-flop for an externally supplied power-save signal.

2. A microcomputer having an operation state and a power-save state, said microcomputer being connected to at least one peripheral circuit and responsive to a power-save instruction to reduce its own power consumption by entering said power-save state, and being connected to an externally-supplied interruption signal to return to said operation state from said power-save state, said micrcomputer comprising:

memory means for storing instructions to be executed by said microcomputer, including said power-save instruction;

means for decoding instructions from said memory means when said microcomputer is in said operation state and for outputting a power-save signal in response to said power-save instruction;

signal outputting means connected to said decoding means and coupled to said externally-supplied interruption signal for outputting from said microcomputer to said at least one peripheral circuit a power-save mode signal in response to said power-save signal, said power-save mode signal indicating that said microcomputer is in said power-save state and said power-save mode signal continuing until said microcomputer receives said externally-supplied interruption signal;

clock generating means for supplying timing signals to said microcomputer;

clock control means connected to said clock generating means and to said decoder means for stopping all said timing signals to said microcomputer in response to said power-save signal and thereby placing said microcomputer in said power-save state; and input means connected to said signal outputting means for accepting an externally supplied power-save signal.

3. A microcomputer according to claim 2, in which said signal outputting means includes a flip-flop circuit having a set terminal coupled to said power save signal, and having a reset terminal coupled to said interruption signal.

4. A microcomputer according to claim 2, in which said signal outputting means includes a flip-flop circuit including means for setting by an external power-save signal and means for resetting by an external reset signal.

* * * * *